'United States Patent Office 3,296,082
Patented Jan. 3, 1967

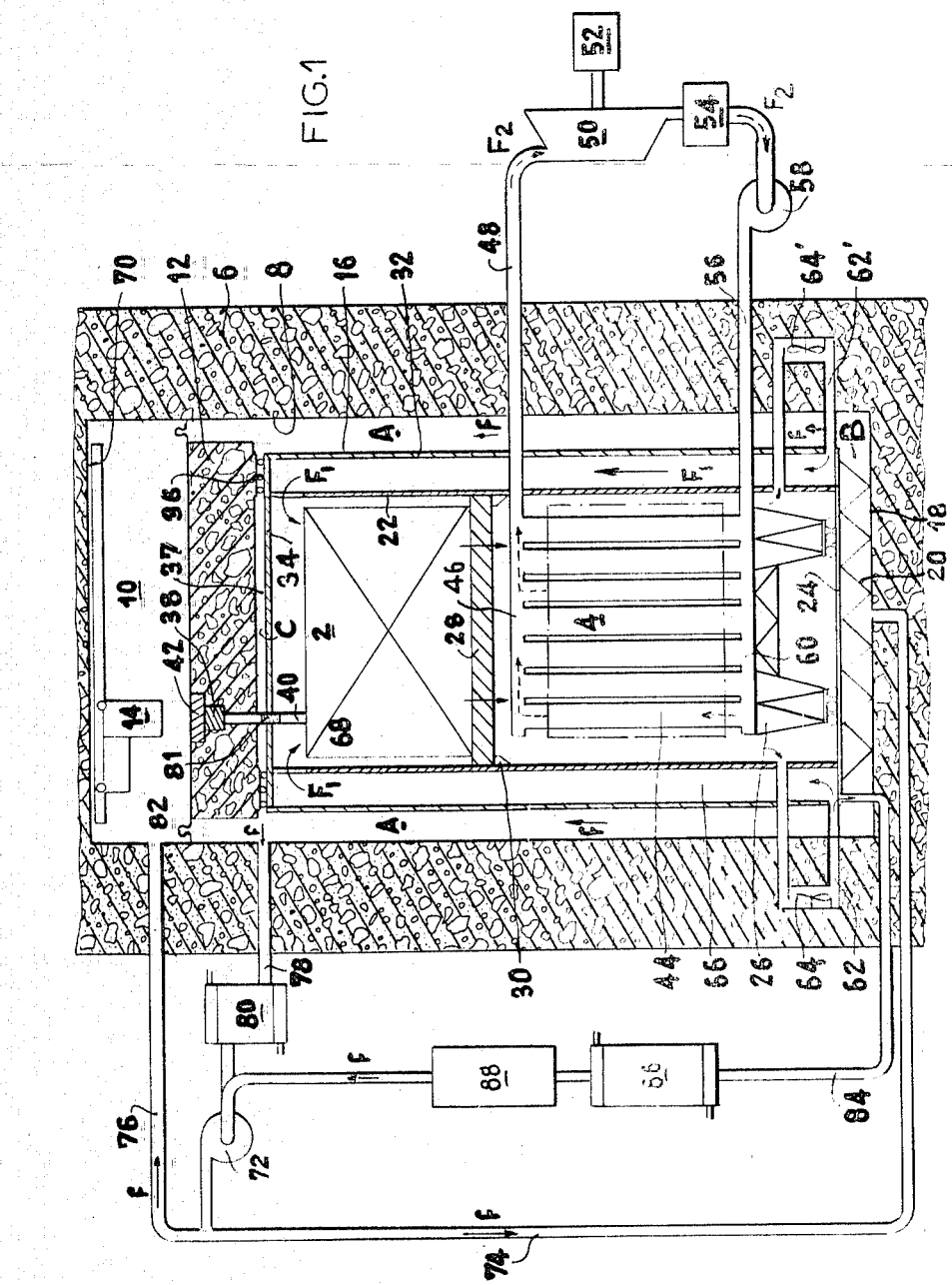

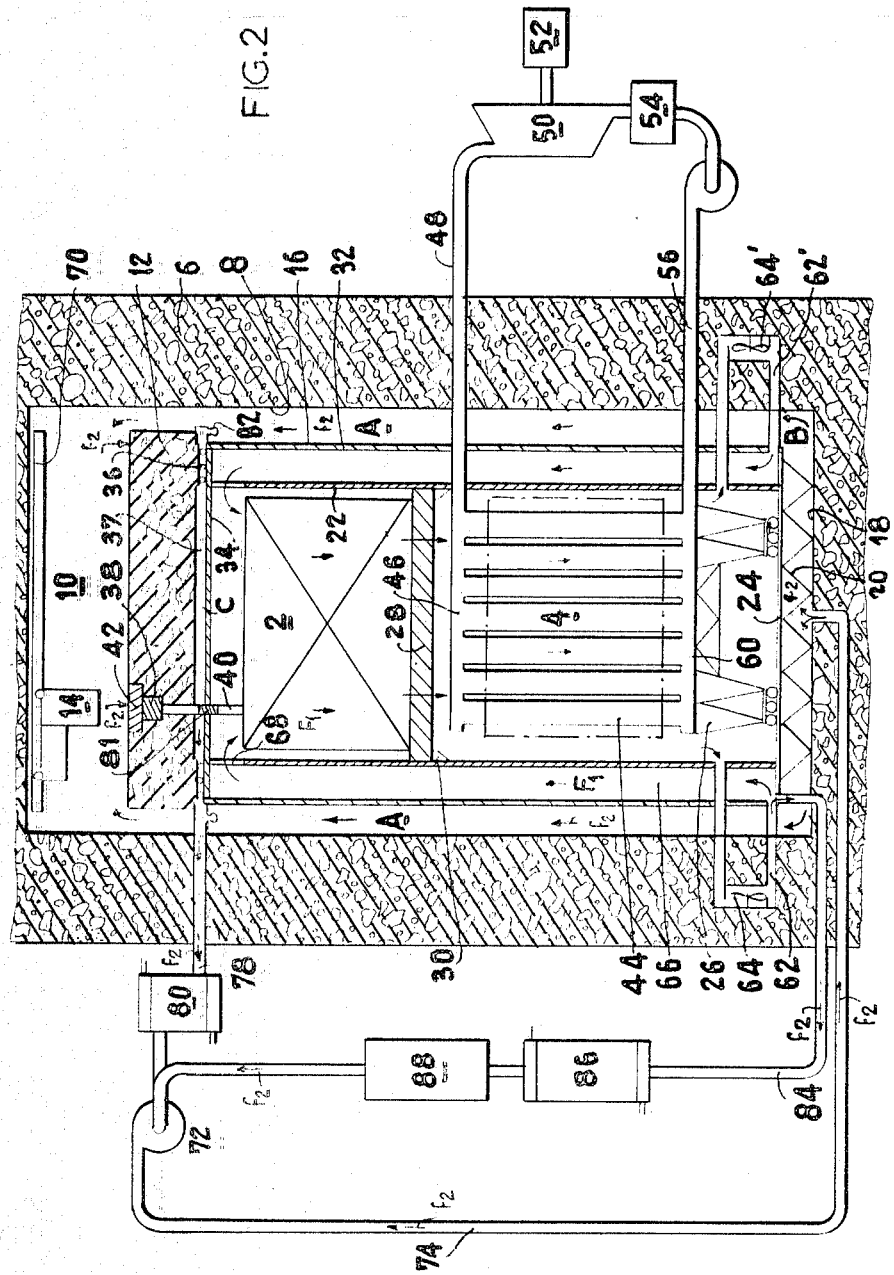

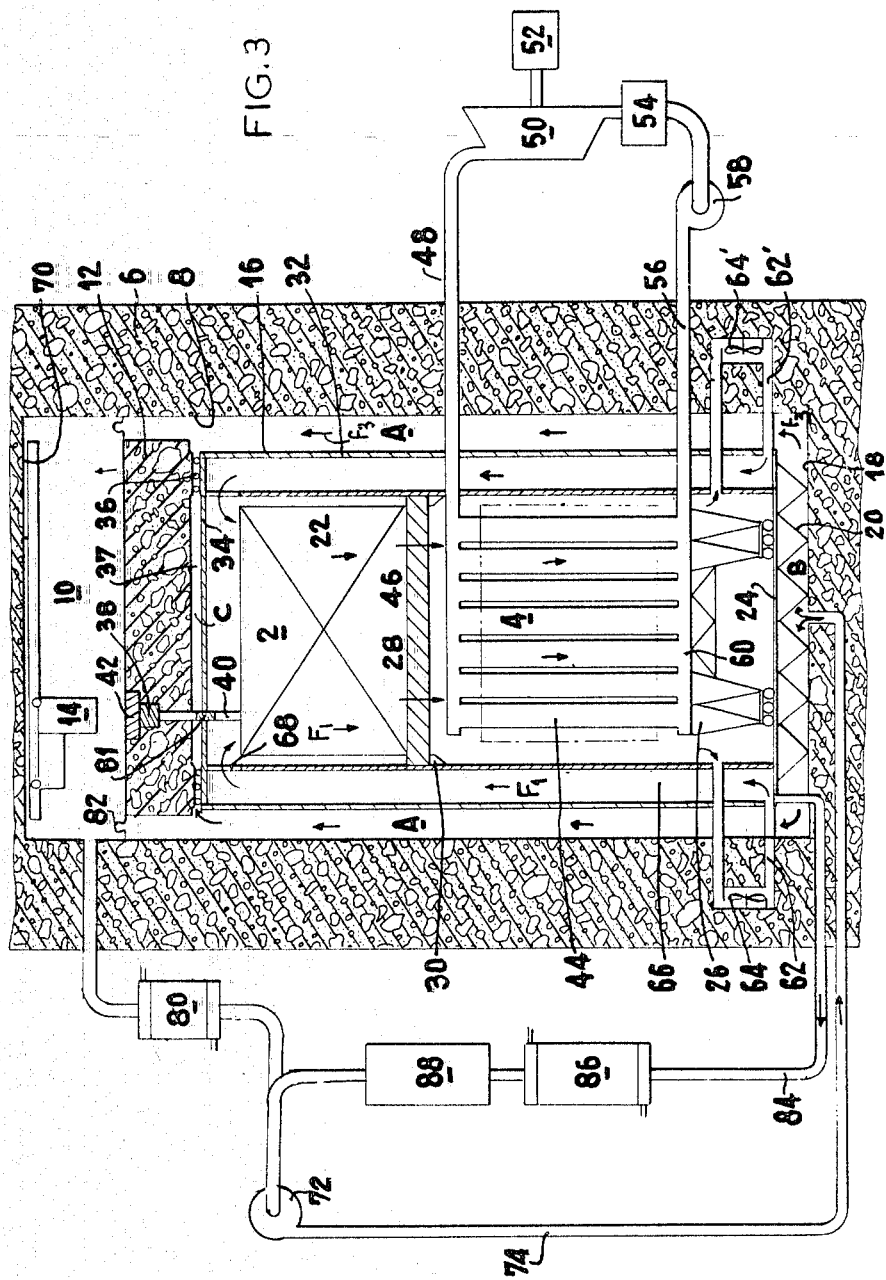

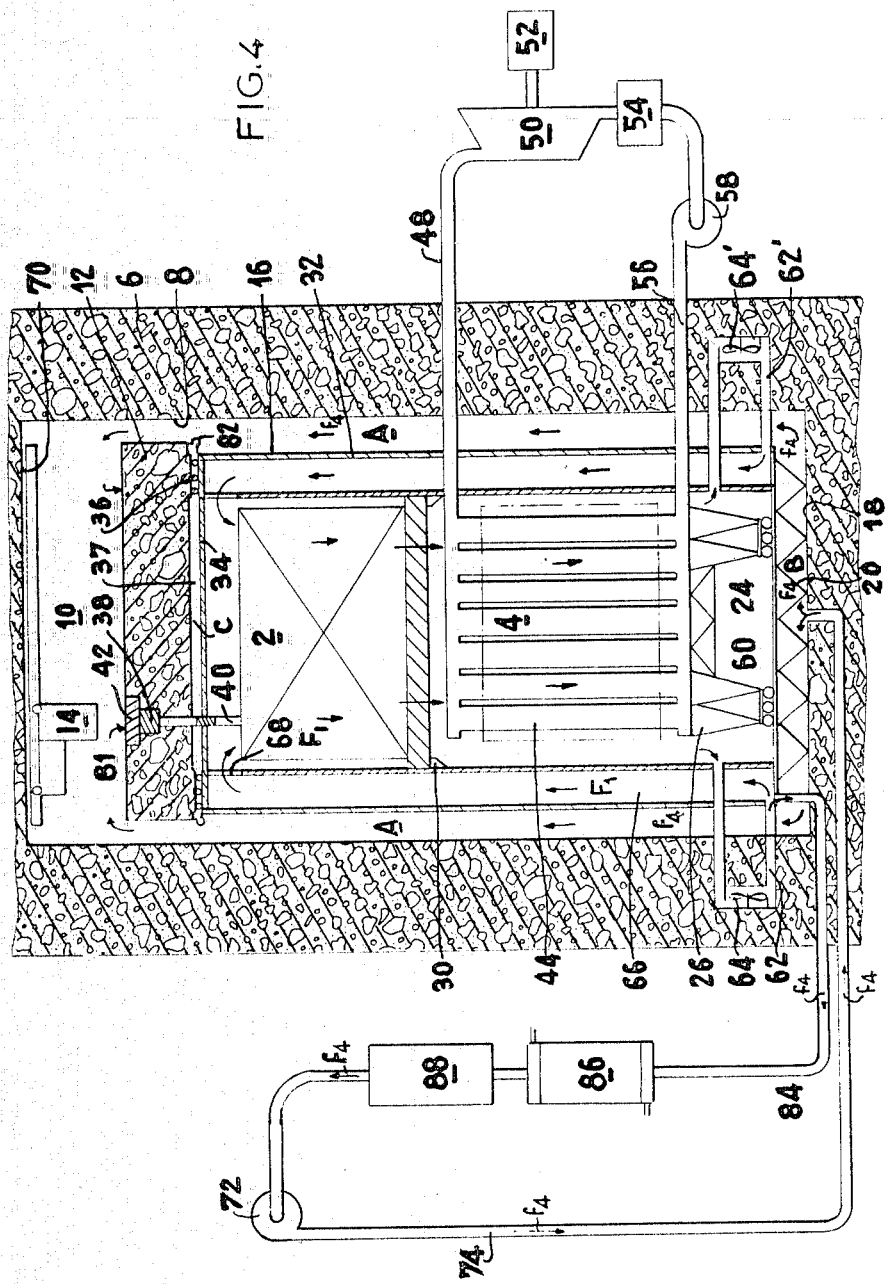

3,296,082
GAS COOLED NUCLEAR REACTOR
POWER PLANT
Georges Lemesle, Paris, Louis Patarin, Gif-sur-Yvette, and Pierre Rouge, Orsay, France, assignors to Commissariat a l'Energie Atomique, Paris, France
Filed July 23, 1964, Ser. No. 384,614
Claims priority, application France, Aug. 1, 1963, 943,490
4 Claims. (Cl. 176—30)

This invention relates to power plant of the kind comprising a heterogeneous nuclear reactor and a heat exchanger which are received in a single enclosure called a cell and which are separated from one another by an anti-radiation shield.

In plant of this kind now under design, using carbon-dioxide-cooled graphite-moderated reactors, the carbon dioxide flows downwards through the reactor and exchanger consecutively, then upwards as between the exchanger, reactor and cell, with the advantage that the same is in contact with the cooling gas only when the same is at its lowest temperature. However, since this lowest temperature is at least some 250° C., direct contact between the gas and the cell is unsatisfactory, more particularly if the cell is made of prestressed concrete. Considerable heat lagging and an extra circuit for keeping the cell temperature low must therefore be provided. This lagging and extra circuit are complicated to provide and, in the event of faults, very difficult to repair.

To obviate this disadvantage, the invention provides a power plant comprising a nuclear reactor and a heat exchanger which are separated from one another by an anti-radiation shield or screen and which are disposed in a single main cell adapted to withstand the pressure of the reactor cooling fluid wherein the reactor and the exchanger are received in a secondary cell co-operating with the main cell to bound an annular zone and comprising a double side wall bounding an annular gap, means being provided to provide a flow of cooling fluid in the annular zone between the two cells at a temperature below the temperature of the fluid leaving the heat exchanger.

In cases where, for instance, the reactor and the heat exchanger are placed vertically one above another in the cell, there are difficulties in transferring the weight of the top element—as a rule, the reactor—to the main cell because of the large weights and dimensions involved and because the temperature and pressure conditions are usually such as to cause unsatisfactory behaviour of the materials. It is usually impossible to place the two elements directly one above another (with the interposition just of the radiation protection) in the cell, for the normal construction of reactors and heat exchangers is such that they cannot withstand the mechanical forces needed in such an arrangement. When the exchanger is the bottom element of the two, it may be possible to provide one or more bearing columns extending through the exchanger and transferring the reactor weight to the bottom of the cell, but heat insulation then becomes very complicated and exchangers must be designed specially for this arrangement.

Conventionally, what is normally done is to provide the cell inner walls with a number of brackets or the like for bearing a rigid bedplate adapted to act as a "floor" for the top element. As a rule, the bedplate is also arranged to provide the protection against radiation and accordingly comprises an appropriate thickness of a radiation-opaque material such as concrete or graphite. The brackets, and therefore the cell side walls, must therefore withstand the weight of the top element plus the weight of the bedplate. The brackets, which must usually be fairly bulky, have the further disadvantage of causing a local reduction in the flow cross-section for the fluid of the main cooling circuit, with the result that load losses are increased and the design of the main circuit is made more complex.

According to the invention, to obviate this disadvantage, the secondary cell is borne by the bottom end of the main cell and transfers the weight of the reactor and exchanger to such end.

The invention will now be described by way of example with reference to the accompanying drawings in which:

FIGURE 1 is a very diagrammatic view of a plant according to the invention, in section along a plane passing through its axis, and FIGURES 2 to 4 are similar views to FIGURE 1, each diagrammatically showing a possible variant of the plant shown therein.

The plant shown in FIG. 1 comprises a carbon-dioxide-cooled nuclear reactor 2 and a heat exchanger 4 both placed inside a single hermetic main cell 6. The same, which must withstand the cooling fluid pressure of approximately 30 bars, can, with advantage, be constructed of prestressed concrete internally lined with a thin metal "skin" 8 for the sake of sealing tightness. An anti-radiation shield 12 is disposed inside the cell 6 above the reactor 2 and separates off from the remainder of the enclosure a chamber or attic 10 in which the pressure is slightly above the pressure of the reactor atmosphere. The chamber 10 is for receiving fuel-handling equipment 14 which, since the pressure in the chamber 10 is above the pressure in the reactor, never contacts fluid coming directly from the reactor. A second or "secondary" cell 16 is disposed inside the first or main cell 6 and is borne by strutting 20 on base 18 of the main cell 6. Disposed in the secondary cell 16 is a first cylindrical tube 22 which is connected to a base 24 and which receives the reactor 2 and the heat exchanger 4, the outline of the latter being diagrammatically indicated by chain-dotted framing. The heat exchanger 4 is borne by beams, as 26, on the base 24 of the secondary cell 16. The reactor is borne by a rigid bedplate 28 which also serves as an anti-radiation shield and which is in turn borne by brackets, as 30, rigidly secured to the tube 22. A second cylindrical tube 32 is connected to the base 24, is coaxial of the first cylindrical tube 22 and extends therearound to form the outer side wall of the secondary cell 16. The tube 32 is covered at the top by a cover 34 which closes the secondary cell 16 at the top. The shield 12 rests on the peripheral part of the cover 34; consequently, the weight of the shield 12 and the vertical forces withstood thereby are transferred directly to the tubes 22, 32 by way of roller supports, as 36. Since there is a gap 37 between the underside of the shield 12 and the top of the cover 34 to facilitate cooling, fuel-loading tubes 38 which extend through the shield 12 have extensions 40 which engage in apertures in the cover 34. The tubes 38 and their extensions 40 are normally closed by a number of top-fitting plugs, as 42; the plugs need not be a completely sealing-tight fit in the tubes 38 since any leaks which occur can be only from the chamber 1 to the remainder of the enclosure and are therefore neither disturbing nor dangerous. All the parts of the secondary cell 16—i.e., the base 24, the two tubes 22, 32 and the cover 34—can be made of fairly thin steel for, as will be seen hereinafter, the pressure differences to be withstood by the cell 16 are fairly small; however, since the cell 16 is required to transmit considerable vertical forces, the tubes 22, 32 can be braced along some of their generatrices to improve the rigidity and the mechanical strength of the cell.

The carbon dioxide of the main cooling circuit flows along the path indicated by arrows F1. The gas enters the top of the reactor core 2 at a temperature, for instance, of about 250° C., is heated by contact with the fuel cells as it descends the fuel cell channels, and leaves the reactor at the bottom at a temperature, for instance, of about 450° C. The gas then flows through the bedplate 28 which is accordingly formed with a large number of baffle channels (not shown), enters the chamber where the heat exchanger 4 is, and descends through tubes 44 of the heat exchanger to yield its heat to the secondary fluid flowing therein.

The secondary fluid—as a rule, water—flows through the circuit indicated by chain line arrows F2. It enters the bottom of the tubes 44 in liquid form and leaves them at the top in the form of vapour to enter a "hot" collector or header 46 whence the vapour goes to a duct 48 extending through the two cells 6, 16, then to a high-pressure turbine 50 driving, for instance, an alternator 52. Upon leaving the turbine 50 the vapour is condensed in a condenser 54, whereafter the water returns, through a duct 56 having pumps 58 and again through the two cells 6, 16, to a "cold" header 60 supplying the water to the bottom of the tubes 44.

Upon leaving the heat exchanger 4, the carbon dioxide, whose temperature has returned to about 250° C., flows through passages, as 62, 62', through which, and through the agency of blowers, as 64, 64', the carbon dioxide is returned from inside the tube 22 to an annular gap 66 between the two tubes 22 and 32, whereafter the gas rises in the gap 66 to the top of the cell 16, then flows through passages 68 with which the tube 22 is formed at this level, to return to the top of the reactor core.

The secondary cell 16 is covered by a heat-insulating material (not shown) to heat insulate the carbon dioxide of the main cooling circuit. In order that the two tubes 22, 32 may remain at the temperature of the least hot fluid in which they are immersed, the inner tube 22 is lagged internally and the tube 32 is lagged externally.

The dimensions and the arrangement of the secondary cell 16 are such that there remain between the two cells 6 and 16:

An annular zone A between the adjacent side walls of the cells;

A substantially cylindrical zone B between the respective bottom ends 18, 24 of the two cells, in which latter zone the strutting 20 for the cell 16 is placed, and A substantially cylindrical zone between the cover 34 and the "roof" 70 of the cells 6, such zone being subdivided by the shield 12 into a cylindrical chamber C of reduced thickness between the cover 34 and the shield 12, and a second zone formed by the chamber or attic 10.

As will be seen hereinafter, the existence of these various zones helps to form an auxiliary closed cooling circuit which helps to keep the temperature near the inner walls of the cell 6 and attic 10 fairly low, for instance, at about 60° C. The auxiliary circuit shown is designed for carbon dioxide to flow through it, in the direction indicated by arrows $f$, at a temperature of 60° C. and at a pressure slightly above the pressure of the gas in the main circuit. The auxiliary circuit comprises seriatim a circulating blower 72 and two lines 74, 76 to which the blower 72 delivers and through which the gas flows to the zone B and to the chamber 10 respectively. From zone B, where the gas cools the base 18 of the main cell 6, the gas rises along zone A and absorbs heat from the side walls of the cell 6. The gas leaves zone A at the top through a line 78, is cooled by a heat exchanger 80, and returns to the blower 72. The gas supplied to the chamber 10 flows through the tubes 38 in the shield 12 since a flexible annular packing 82 prevents any direct flow of gas between the adjacent side walls of the shield 12 and cell 6, but the gas can flow through leakage grooves (not shown) in the plugs 42 into the tubes 38 sufficiently to cool the same. The gas then goes to zone C via orifices in the extensions 40 of the tubes 38; a final and ungrooved plug 81 closes that part of the extension which extends into the orifice in the cover 32 to limit leaks to the primary circuit. From zone C, where it mainly cools the underside of the shield 12, the gas from the attic goes to the top of zone A to rejoin the gas from zone B. All the gas then flows from the cell 16 through the line 78 to the heat exchanger 80 for cooling therein.

Since the pressure in the auxiliary circuit is slightly above the pressure in the main cooling circuit and leaks from the auxiliary circuit to the main circuit are allowable, absolute sealing tightness between these two circuits is unnecessary. Leaks are particularly heavy during channel loading, when one of the tubes 38 and its extension 40 must be open. Since, however, some of the main cooling circuit gas must be purified continuously, injecting purified gas from the main circuit into the secondary circuit may be one advantageous way of compensating for previous leakages. To this end, for instance, a line 84 can be provided through which some of the gas delivered by the main circuit blower 64—i.e., gas at a temperature of about 250° C.—is removed to a heat exchanger 86 bringing the gas temperature to 60° C., whence the gas goes to a regenerator 88, whereafter the gas is injected into the secondary circuit near the intake of the blower 72.

The embodiment shown in FIG. 2, in which like elements have the same references as in FIG. 1, has a different auxiliary circuit. The gas delivered by the blower 72 is injected only into zone B, then rises through zone A to the chamber 10, the flexible gasket 82 being disposed not between the shield 12 and the cell 6 but between the shield 12 and the top of the secondary cell 16. The gas then flows through the tubes 38 in the shield 12, scavenges the zone C and is removed through the passage 78 which in this embodiment communicates only with the zone C. The path taken by the auxiliary circuit fluid in FIG. 2 is indicated by arrows $f2$.

In another variant, shown in FIG. 3, in which like elements have the same references as in FIG. 1, the gas delivered by the blower 72 is injected only into the zone B but follows a different path inside the main cell. As in FIG. 1, the flexible annular packing 82 is disposed between the shield 12 and the main cell 6, but the line 78 communicates with the attic 10, and so the gas flows through zone A, into zone C, flows upwards through the shield 12, scavenges the attic 10, and finally leaves through the line 78, is cooled in the exchanger 80 and returned to the blower 72. The path of the secondary fluid in FIG. 3 is indicated by arrows $f3$. Without departing from the scope of this variant, the gas can flow in the main cell 6 along the same path but in the opposite direction.

In the variant shown in FIG. 4, all the auxiliary circuit gas discharges into the main cooling circuit via deliberate leaks. The secondary gas is injected into the zone B, then rises through zone A as far as the attic 10, the gasket 82 being disposed between the shield 12 and the top of the secondary cell 16. From the attic 10 the gas enters the tubes 38 via the grooves in the plugs and reaches zone C through the orifices in the extensions 40. In this particular variant, the plug closing that part of the extension 40 which extends into the cover is also grooved, so that the gas in zone C can flow this way to inside the secondary cell 16.

As will be apparent, in this latter variant all the auxiliary circuit gas (the path followed thereby is indicated by arrows $f4$) is formed by cooled and regenerated main circuit gas. This arrangement has the advantage of simplifying circuit construction but the disadvantage of reducing reactor efficiency, since more gas is taken for purification than is necessary.

As the foregoing description shows, the invention has many advantages over the prior art. Inter alia, the weight of all the items in the main cell is taken by the base thereof, and the top and side walls of the cell have to withstand only the cooling gas pressure; the construction of the main cell is simplified; if the main cell is made of prestressed concrete, the manufacture and positioning of the sealing skin is simplified; the auxiliary cooling circuit for the main cell inner wall is obviated, with its usually complicated assembly and uneven efficiency (as a rule, this circuit is in the form of pipe coils connected to the outside of the sealing skin of a prestressed concrete cell); the heat lagging is secured to the secondary cell and not to the main cell inner wall (in cases where the latter is made of prestressed concrete or of a steel which has to be protected against heat), something which simplifies the positioning of the heat insulation and reduces the risk of hot spots in the main cell due to irregular lagging or to local damage to the lagging; and there is 100% safety in the event of leakage through the main cell, since the leakage fluid comes from the uncontaminated auxiliary circuit.

Of course the invention is not limited to the embodiments which have been described and shown and which have been given just as examples and which can be varied in many ways without any departure from the scope of the invention. The invention covers inter alia plant comprising in a single pressure cell only, for instance, the reactor and the heat exchanger or the reactor and the charging device; the combination of the three elements has been given only on a preferred basis because the invention seems likely to provide the greatest advantages with such a combination.

We claim:
1. In a nuclear power plant cooled by a gas at super atmospheric pressure, a pressure vessel and biological shield, a shell supported in and by said pressure vessel in spaced relation to said pressure vessel, an annular wall supported in and by said shell and defining therewith an annular space, a reactor core and a heat exchanger located one above the other within said annular wall, a radiation shield separating said core and said exchanger within said annular wall, means for circulating a main coolant gas in a closed circuit comprising said reactor core, said heat exchanger and said annular space and means for maintaining coolant gas at a temperature below the minimum temperature of said coolant gas in said closed circuit in the space between said shell and said pressure vessel whereby said pressure vessel is maintained at a relatively low temperature.

2. A plant as described in claim 1, said annular wall being supported by the bottom of said shell and including means for transferring the weight of said reactor core and said heat exchanger to the bottom of said shell.

3. A plant as described in claim 1, said reactor core being supported by said shield and including means on said annular wall above said heat exchanger for supporting said shield.

4. A plant as described in claim 1 including a second radiation shield inside said pressure vessel and biological shield and above said shell, an attic defined between said second radiation shield and said pressure vessel and biological shield, closable conduit means connecting said attic and said reactor core, means for refueling said reactor core in said attic and means for delivering to said attic a flow of coolant gas at a pressure slightly above the pressure in said closed circuit whereby coolant leaks from said attic toward said core.

References Cited by the Examiner

UNITED STATES PATENTS

| | | | |
|---|---|---|---|
| 2,946,732 | 7/1960 | Wootton | 176—59 |
| 2,997,435 | 8/1961 | Millar et al. | 176—59 |
| 3,009,867 | 11/1961 | Kinsey. | |
| 3,034,976 | 5/1962 | Fortesque et al. | 176—52 |
| 3,127,323 | 3/1964 | Bray et al. | |
| 3,170,846 | 2/1965 | Blumberg | 176—60 |
| 3,205,140 | 9/1965 | Coudray et al. | 176—60 |

FOREIGN PATENTS

| | | |
|---|---|---|
| 568,894 | 7/1958 | Belgium. |
| 1,197,490 | 6/1959 | France. |
| 940,919 | 11/1963 | Great Britain. |

CARL D. QUARFORTH, *Primary Examiner.*

L. DEWAYNE RUTLEDGE, *Examiner.*

UNITED STATES PATENT OFFICE
CERTIFICATE OF CORRECTION

Patent No. 3,297,082                 January 10, 1967

Lester J. Tranel et al.

It is hereby certified that error appears in the above numbered patent requiring correction and that the said Letters Patent should read as corrected below.

Column 1, line 37, for "adaption" read -- adaptation --; column 2, line 14, strike out "ing one mode of treating the component depicted in" and insert instead -- FIGURE 9 is a section side view of the blank of --; column 6, line 12, for "adajacent" read -- adjacent --; line 47, for "secttionalized" read -- sectionalized --; column 7, line 33, for "aany" read -- any --; line 45, for "special" read -- spatial --.

Signed and sealed this 20th day of August 1968.

(SEAL)
Attest:

Edward M. Fletcher, Jr.
Attesting Officer

EDWARD J. BRENNER
Commissioner of Patents